United States Patent
Nanno et al.

[11] Patent Number: 6,038,004
[45] Date of Patent: Mar. 14, 2000

[54] ACTIVE MATRIX LIQUID CRYSTAL DISPLAY FOR PROJECTION SYSTEM

[75] Inventors: Yutaka Nanno, Takarazuka; Masumi Izuchi; Tetsuya Kawamura, both of Hirakata; Mika Nakamura, Katano; Kazuo Inoue, Hirakata, all of Japan

[73] Assignee: Matsushita Electric Industrial Co., Ltd., Osaka, Japan

[21] Appl. No.: 08/841,588

[22] Filed: Apr. 30, 1997

[30] Foreign Application Priority Data

Apr. 30, 1996 [JP] Japan ................................. 8-109129
Sep. 25, 1996 [JP] Japan ................................. 8-252594

[51] Int. Cl.[7] ..................... G02F 1/136; G02F 1/1343; G02F 1/1345
[52] U.S. Cl. .................. 349/44; 349/42; 349/43; 349/139; 349/38; 359/67; 359/339 F; 359/54
[58] Field of Search ............... 349/44, 42, 43, 349/139, 38, 86, 5, 111; 359/67, 339 F, 54

[56] References Cited

U.S. PATENT DOCUMENTS

| | | | |
|---|---|---|---|
| 4,904,061 | 2/1990 | Aruga | 350/339 F |
| 5,191,450 | 3/1993 | Yajima et al. | 359/54 |
| 5,414,547 | 5/1995 | Matsuo et al. | 359/67 |
| 5,706,064 | 1/1998 | Fukunaga et al. | 349/111 |
| 5,782,665 | 7/1998 | Weisfield et al. | 349/111 |

OTHER PUBLICATIONS

K. Kobayashi et al., *Asia Display '95*, pp. 343–346 (1995).
T. Koseki et al., *Display Manufacturing Technology Conference*, pp. 107–109 (1995).

*Primary Examiner*—Frank G. Font
*Assistant Examiner*—Roy M. Punnoose
*Attorney, Agent, or Firm*—Wenderoth, Lind & Ponack, L.L.P.

[57] ABSTRACT

An active matrix liquid crystal display for projection system comprises a light shielding layer 12 arranged between a layer 13 including thin film transistors and a first substrate 11 for shielding an injection light toward each of the thin transistors, said light shielding layer 12 having a plurality of openings through which each of the pixel electrodes 22 is exposed against the injection light. The light shielding layer 12 is preferably made of metal and is connected to an electric source. A level of voltage applied on the data lines is adverse to that applied on the light shielding layer with respect to polarity of the applied voltage.

7 Claims, 13 Drawing Sheets

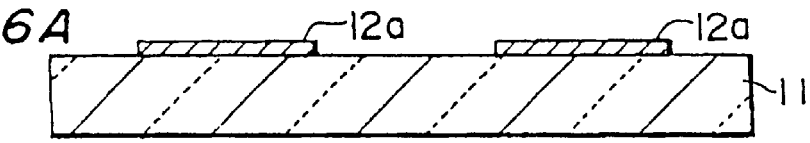
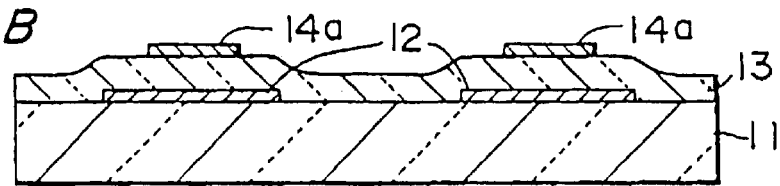
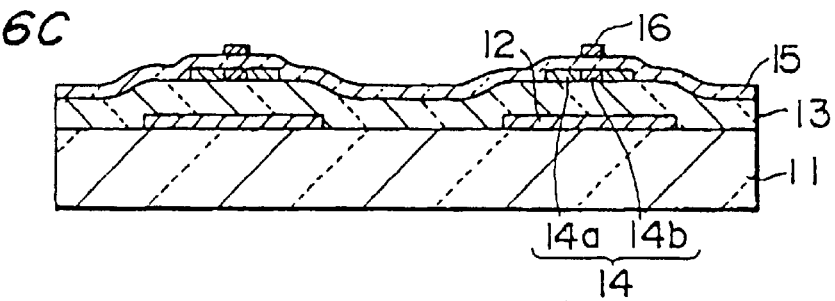
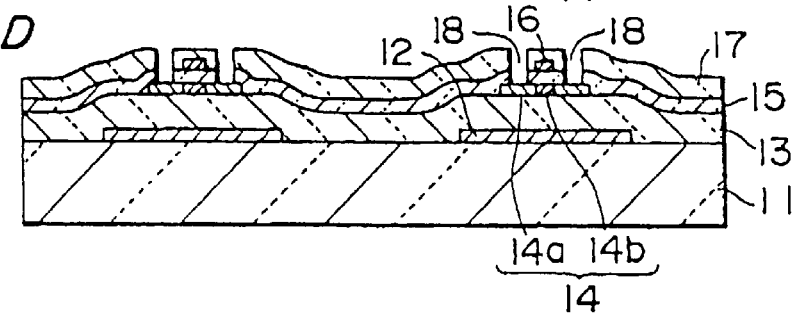
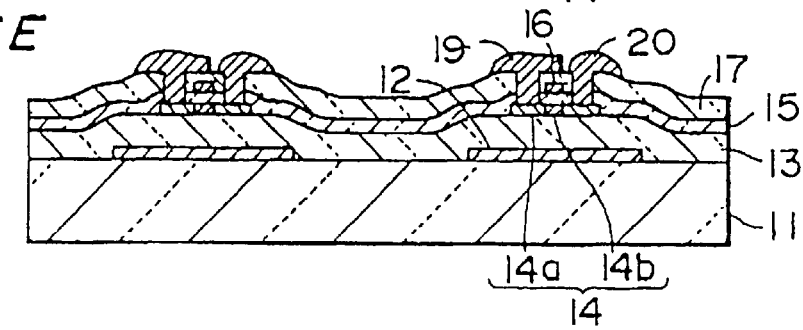
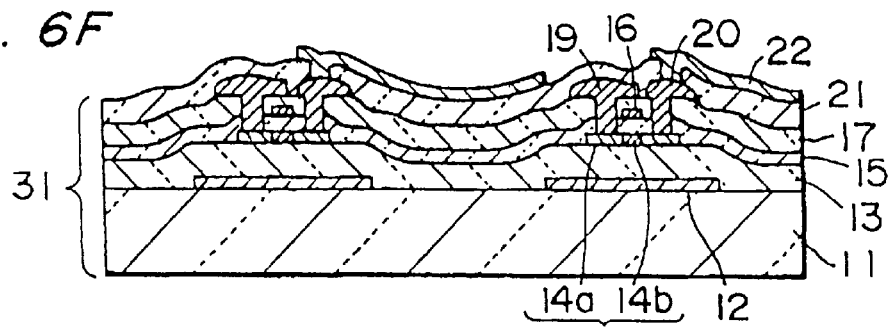

Injection light

Injection light

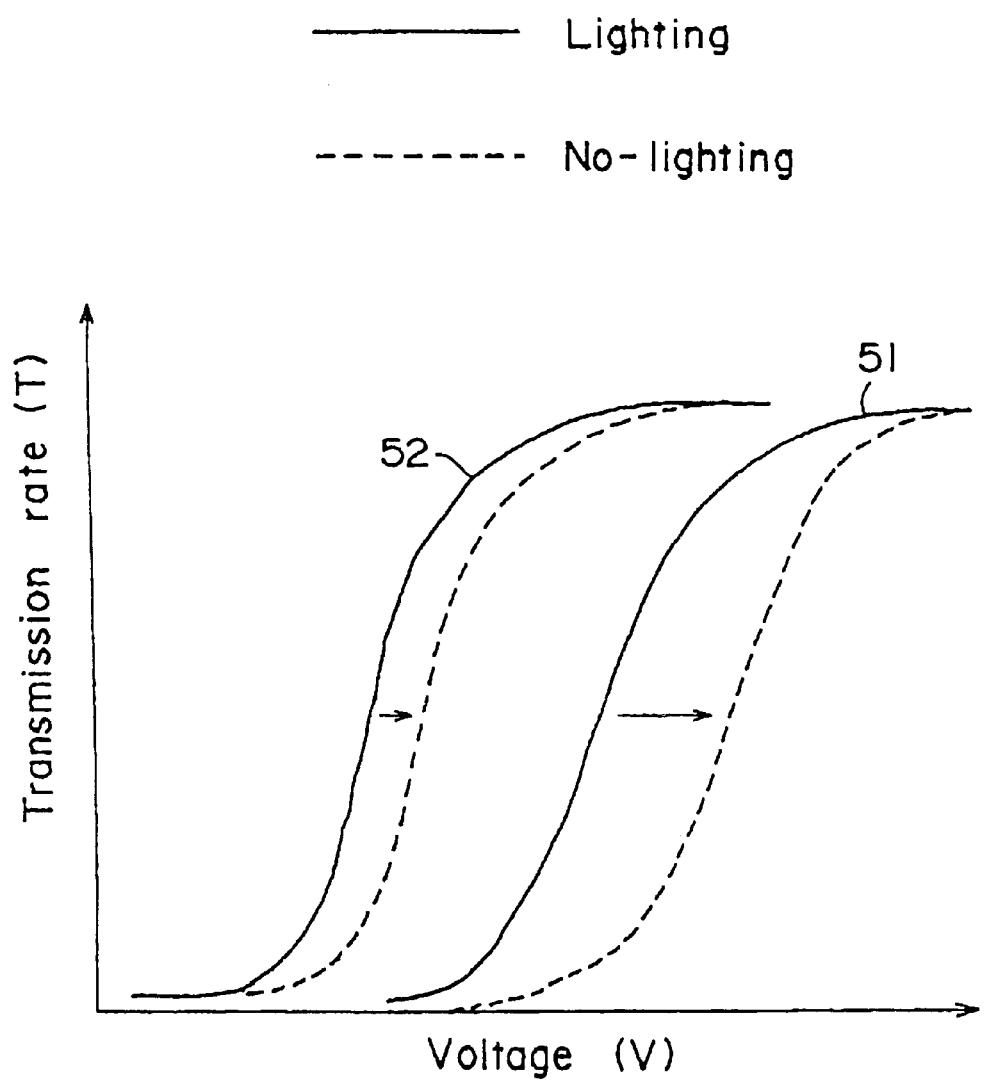

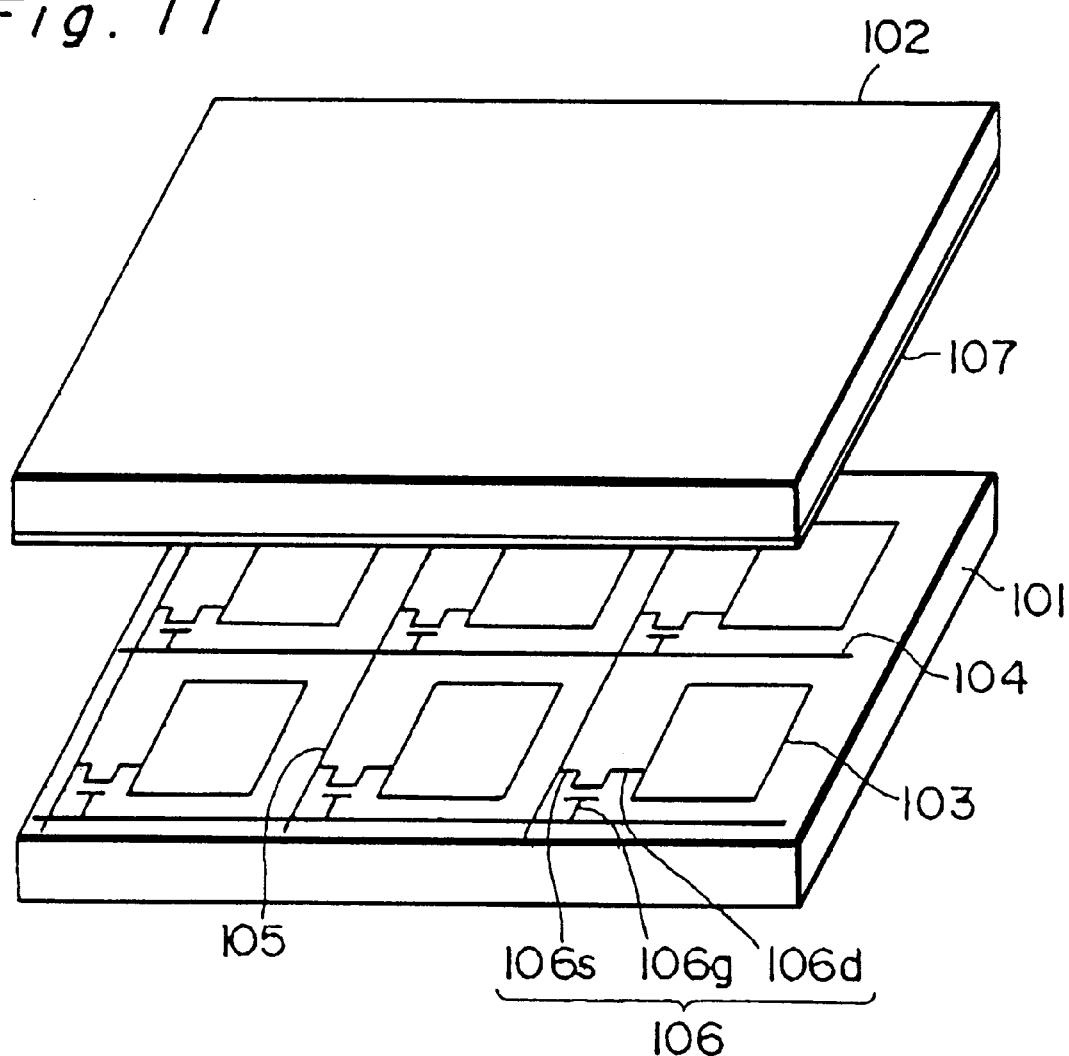
Fig. 11
Lighting

——— Lighting

------ No-lighting

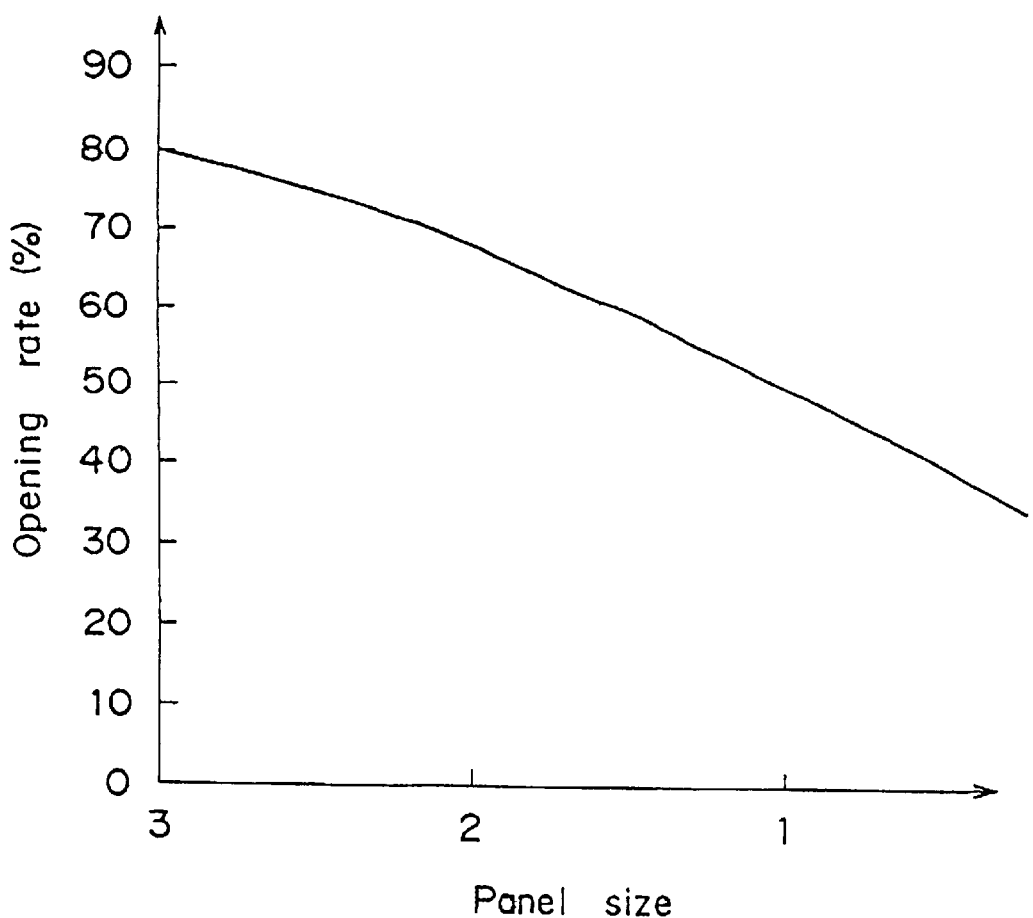

ACTIVE MATRIX LIQUID CRYSTAL DISPLAY FOR PROJECTION SYSTEM

FIELD OF THE INVENTION

The present invention relates to an active matrix liquid crystal display for a projection system which has a thin film transistor and a projection system using the same.

BACKGROUND OF THE INVENTION

An active matrix liquid crystal display provided with a thin film transistor (TFT) for each pixel electrode of a liquid crystal panel has recently been studied because a quality image higher than that of a simple matrix display device can be obtained.

A conventional active matrix type display device will be explained with reference to the accompanying drawings. FIG. 11 is a perspective view schematically showing a liquid crystal panel part of a conventional active matrix type liquid crystal display device. In FIG. 11, a first substrate 101 of a transparent glass is located opposite to a second substrate 102 of the same transparent glass. On the first substrate 101, there are formed a pixel electrode 103 for driving said liquid crystal in a matrix configuration, a scanning line 104 for applying in a predetermined cycle, a voltage to each pixel electrode 103, a data line 105 for applying an image signal voltage to each pixel electrode 103, and a thin film transistor part 106 comprising a source electrode 106s connected to the data line 105, a gate electrode 106d connected to the scanning line 104 and a drain electrode 106d connected to the pixel electrode 103. This first substrate 101 is generally referred to as an array substrate. On the other hand, on the second substrate 102, there is a transparent conductive film 107 which serves as an opposite electrode of the pixel electrode 103 on the array substrate 101. The second substrate 102 is generally referred to as an opposite substrate 102.

Normally, since a transmission type liquid crystal display device is requested to allow light from a back surface light source to pass through, the pixel electrode 103 must be made of a transparent conductive film. Further, when the liquid crystal panel part is provided with a color display, there must be provided with a color filter in each pixel of the opposite substrate 102.

In the liquid crystal panel part constituted in the aforementioned manner, by changing a voltage applied to a liquid crystal layer in accordance with the image signal during the period in which the thin film transistor part 106 is driven, the transmittance of light from a back surface light source which passes through the liquid crystal panel changes. Therefore, the change in transmittance of light is displayed as an image. Incidentally, as a semiconductor material of the thin film transistor part 106, for example, amorphous silicon (a-Si), polycrystal silicon (p-Si) having high mobility, cadmium selenium (CdSe), etc. may be used.

FIG. 12 is a view showing a construction of a typical three-plate type projection system (liquid crystal projector) using a conventional liquid crystal panel as a light valve for optical switch. An optical path of light emitted from a light source such as a metal halide lamp, etc. is divided for each of three primary colors by using a dichroic mirror (DM) and a reflection mirror (M), and is projected on the light valve (LB) comprising liquid crystal panels for each of a red color (R), a green color (G) and a blue color (B). Then, each color is projected on a screen as an image by switching with the light valve (LB). Normally, a TN (twisted nematic) liquid crystal is used for the display mode of the liquid crystal in the liquid crystal panel.

However, since the light valve comprising the TN liquid crystal cuts about half of incident light with a polarizing plate on the incident side, it is difficult to effectively use light emitted from the lamp. In order to effectively use light from the light source, there has recently been suggested a liquid crystal light valve using a polymer dispersion type liquid crystal, wherein a liquid crystal as a liquid crystal material is dispersed in a polymer to control transmittance and scattering of light at the interface between the polymer and the liquid crystal by means of voltage application, thereby performing optical switching (Asia Display '95, S16-3, p343). According to this display system, it is not necessary to use a polarizing plate and, therefore, it is possible to ensure an output of light with respect to the same input by two or more times as compared with the a display method using the TN liquid crystal.

Furthermore, as one element of important performances required for the light valve to obtain a liquid crystal projector with higher brightness and higher contrast, a high aperture rate is required. The aperture rate refers to a ratio of the part contributing to an actual modulation of light to the size of one pixel. The part which does not contribute to the modulation of light in one pixel includes a thin film transistor part, a scanning line part, a data line part and an auxiliary volume part which runs parallel with respect to a liquid crystal, and a gap part between the pixel electrode and each bus line. In this conventional active matrix liquid crystal display, there are the following problems.

Firstly, when the part which does not contribute to the modulation of light is irradiated with light, for example, when light is allowed to be incident on a channel of the thin film transistor part, there arises a problem in that a current in the OFF state increases, as shown in a characteristic curve of a drain current (Id)—gate voltage (Vg) of the transistor of FIG. 13, so that the switching characteristic is deteriorated. Especially, when using the polymer liquid crystal dispersion type liquid crystal as a liquid crystal material used in the liquid crystal panel, an operation error of the transistor is caused by light scattering. When using a single crystal silicon or a polycrystal silicon having high mobility as the material of the thin film transistor, a coplanar type structure which is present on the side of the glass substrate with respect to the gate electrode is provided as the structure of the thin film transistor. In this case, since the channel region of the thin film transistor is formed in a self-matching manner immediately below the gate electrode, 10 it is required for light to be incident from the side of the opposite substrate because the gate electrode must be used as the light shielding material. When the liquid crystal material to be used would be the TN liquid crystal, there is no problem because light passing through the panel basically or proceeds in a straight direction. On the other hand, when using the polymer dispersion type liquid crystal as the liquid crystal material, light scattering arises inside of the liquid crystal so that light scattered at the angle shown in the drawings invades the lower part of the gate electrode to increase the off current of the transistor, which results in deterioration of the contrast.

Secondly, in the conventional light valve using the TN liquid crystal, a black matrix for shielding these gap parts was formed on the side of the opposite substrate to prevent light from being incident on the channel part of the thin film transistor part and to cover the region where the liquid crystal is not modulated with the voltage and prevent light leakage in this region, which results in improvement of the contrast. However, the size of the black matrix must be determined by taking the precision of lamination of the array substrate, so that a proportion of the black matrix part to the pixel increases with the decrease of the size of the pixel. Consequently, the aperture rate is lowered. On the other hand, miniaturization of the system requires the liquid crystal light valve to be smaller, but the miniaturization of the liquid crystal light valve can become a limitation factor against the aperture rate. For example, seen from FIG. 13 showing a relation between the panel size and the aperture rate of a conventional general liquid crystal light valve (the assemblage precision: 3 m; the pixel number: 640×480; the alignment precision of the array substrate: 2 m; both minimum line width ($L_{min}$) and space ($S_{min}$) between the same minimum layers: 5 m), the panel size of about 1.5 inch has an upper limit of 55% as the aperture rate.

Therefore, considering a higher aperture rate with respect to the problem of the miniaturization, there has been proposed the BM-on-array technique for moving the aforementioned black matrix (BM) layer from the opposite substrate side to the array substrate side (Display Producing Technology Conference, Santa Clara, 1995, pp 107). As the black matrix on the matrix array according to the BM matrix technique, a photosensitive black resin material is used. However, in this case, when using a black resin as a black matrix material, 1 m or more of the film thickness is required because of the limitation of the light shielding rate of the resin material, so that the non-oriented region of the liquid crystal is formed in the vicinity of the step portion of the edge of the black matrix, resulting in a problem that the display characteristic such as light leakage, etc. is deteriorated. Furthermore, there is an another problem that, the temperature inside of the panel rises by light irradiation because the thermal conductivity of the black resin is low and, resulting in a variation in transmittance caused by the unevenness of the temperature inside of the panel and thus unevenness of the display chacteristics.

SUMMARY OF THE INVENTION

A first object of the present invention is to solve the aforementioned conventional problems all at once, thereby to provide an active matrix liquid crystal display having an increased aperture rate.

A second object of the present invention is to provide an active matrix liquid crystal display having substantially no display unevenness and light leakage due to high temperature and high luminance.

A third object of the present invention is to provide an active matrix liquid crystal display having a good light resistance to the thin film transistor.

Another object of the present invention is to provide a projection system having a good light resistance in case of using the polymer dispersion type liquid crystal as the liquid crystal material.

According to a first aspect of the present invention, there is provided an active matrix liquid crystal display comprising:

a first and a second transparent substrates, located opposite to each other and having a liquid crystal layer interposed therebetween, said first substrate being provided at said opposite upper surface with scanning lines extended laterally in a parallel manner, data lines extended vertically in a parallel manner to cross said scanning lines and a plurality of pixel electrode, each positioned in each one o areas enclosed by said scanning lines and data lines, said second transparent substrate provided with transparent electrodes, each arranged opposite to a corresponding pixel electrode;

thin film transistors each positioned in one of said areas enclosed by said scanning lines and said data lines and each comprising a gate electrode connected to one of said scanning lines, a source electrode connected to one of said data lines and a drain electrode connected to one of said pixel electrode;

a light shielding layer interposed between said a layer including said thin film transistors and said first substrate for shielding said thin film transistor from an injection light, said light shielding layer having a plurality of openings through which each of said pixel electrodes is exposed against the injection light.

According to the present invention, said light shielding film is formed between a thin film transistor and a first substrate having the thin film transistor and has an opening part for exposing a pixel electrode, the aperture rate can be enlarged, and at the same time, strong incident light from the back light source can be shielded and does not enter into the semiconductor layer of the thin film transistor and then the amount of a leakage current of the transistor does not increase, thereby obtaining good display characteristic.

In a preferred embodiment, said light shielding layer may be made of electric conductive materials such as metal, because the thermal conductivity is larger that than of the black resin. Therefore, an increase in temperature of the light valve can be inhibited and, at the same time, the film thickness of the light valve can be made thinner than the black resin. Therefore, it becomes hard to form the non-oriented region of the liquid crystal by means of the step part formed on the peripheral part of the light shielding film. As a result, deterioration of display characteristic can be inhibited.

In an another preferred embodiment, said light shielding layer may be connected to an electric source to make a storage capacitance between overlapping areas of the pixel electrodes and the light shielding layers.

In the active matrix liquid crystal display according to the present invention, a level of voltage applied on said data lines and a level of voltage applied on said light shielding layer may be adverse to each other with respect to polarity of the applied voltage so as to depress amplitude of an image signal voltage, resulting in a reduced power consumption.

In an embodiment of the present invention, said liquid crystal layer interposed between said first and second substrates may be a complex of a liquid crystal material dispersed in a polymer matrix, which can prevent a drain current from increasing when an applied voltage turns off.

In order to prevent the incidence of the light from the upper part of TFT, An active matrix liquid crystal display may comprises:

a first and a second transparent substrates, located opposite to each other and having a liquid crystal layer interposed therebetween, said first substrate being provided at said opposite upper surface with scanning lines extended laterally in a parallel manner, data lines extended vertically in a parallel manner to cross said scanning lines and a plurality of pixel electrode, each positioned in each one of areas enclosed by said scanning lines and data lines, said second transparent substrate being provided with transparent electrodes, each arranged opposite to a corresponding one of said pixel electrodes;

thin film transistors, each positioned in one of said areas enclosed by said scanning lines and said data lines and each comprising a gate electrode connected to one of said scanning lines, a source electrode connected to one of said data lines and a drain electrode connected to one of said pixel electrode;

wherein said source electrode is formed to shield a channel zone of said thin film transistor from light entering into said liquid crystal layer.

If the above embodiment has a back light source, a light shielding layer may be additionally interposed between said a layer including said thin film transistors and said first substrate, said light shielding layer having a plurality no of openings through which each of said pixel electrodes is exposed against light entering into said liquid crystal layer from said first substrate side.

According to a second aspect of the present invention, there can be provided a projection system comprising at least three liquid crystal panels as a light valve for optical switch, each of said at least three liquid crystal panels being arranged respectively on each of optical paths of light emitted from a light source to be divided for each of three primary colors: a red color (R), a green color (G) and a blue color (B) by means of dichroic mirrors (D) and reflection mirrors (M), and each color being projected on a screen as an image by switching with said light valves;

wherein said light valves are said active matrix liquid crystal display panel provided with a liquid crystal layer made of said complex of a liquid crystal material dispersed in a polymer matrix to prevent a drain current from increasing when an applied voltage turns off.

BRIEF DESCRIPTION OF THE DRAWINGS

FIGS. 6A to 6F are sectional views each showing a step in the method of preparing an array substrate of the active matrix liquid crystal panel for a projection system according to the third embodiment of the present invention.

FIG. 9 is a graph showing a voltage-light transmittance characteristic curve of a polymer dispersion type liquid crystal and a TN liquid crystal.

FIG. 11 is a perspective view schematically showing a liquid crystal panel part of a conventional active matrix type liquid crystal display device.

FIG. 14 is a graph showing a relation between the panel size and the aperture rate of a conventional general liquid crystal light valve.

DETAILED DESCRIPTION OF THE INVENTION (First Embodiment)

The first embodiment of the present invention will be explained with reference to the drawings.

Figure 1:
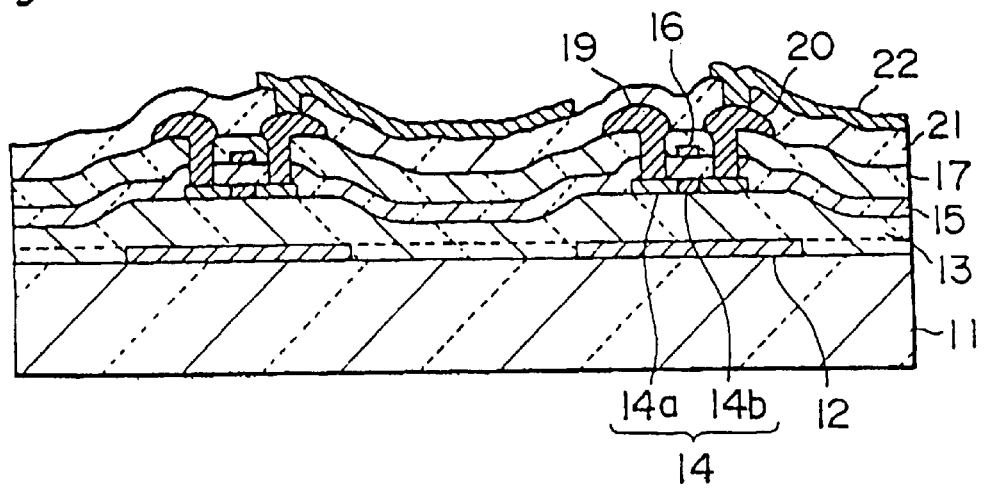
FIG. 1 is a sectional view showing a construction of an array substrate of the active matrix liquid crystal panel for a projection system according to the first embodiment of the present invention.

FIG. 1 is a sectional view showing a construction of an array substrate of the active matrix liquid crystal panel (AM-LCD) for a projection system according to the first embodiment of the present invention. As shown in FIG. 1, a metal thin film 12 of chromium (Cr) as a light shielding film having a plurality of openings is formed over a glass substrate 11 as a first substrate, and a polycrystal silicon film 14 comprising an ohmic region 14a and a channel region 14b as a semiconductor layer is formed over each metal thin film 12 through a first interlayer insulating film 13 of a silicon oxide ($SiO_2$). On each polycrystal silicon film 14, a gate electrode 16 is selectively formed on the channel region 14b through a gate insulating film 15. On a second interlayer insulating film 17 for insulating the gate electrode 16, a source electrode 19 and a drain electrode 20 are respectively formed on each ohmic region 14a through a contact hole. A pixel electrode 22 of ITO (indium tin oxide film) to which one end of the drain electrode is electrically connected is formed on a third interlayer insulating film 21 so that the electrode 22 extends to the side end part of the source electrode 19 of the adjacent thin film transistor part.

A method for a producing the AM-LCD for a projection system according to the first embodiment of the present invention will be explained with reference to the accompanying drawings, hereinafter.

Figure 2A:
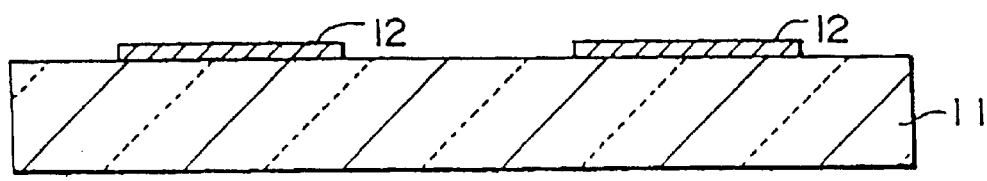
FIGS. 2A to 2C are sectional views each showing a step in the method for producing the active matrix liquid crystal panel for a projection system according to the first embodiment of the present invention.

FIGS. 2A to 2C and 3A to 3C are sectional views showing steps in the method for producing the liquid crystal panel according to the first embodiment of the present invention. On explaining only a substrate on which a thin film transistor is formed, namely an array substrate, as shown in FIG. 2A, a metal thin film 12 of chromium (Cr) as a light shielding film is deposited over a glass substrate 11 in a thickness of 100 nm, followed by patterning in a predetermined shape to make a plurality of openings. As the material of the metal thin film 12, there may be used metals having a sufficient light shielding property, such as titanium (Ti), tantalum (Ta), aluminum (Al), aluminum alloy, nickel (Ni), tungsten (W), etc. in addition to chromium; or black non-metallic thin films which can endure a switching device formation process in the following steps, such as organic materials (e.g. black resist, etc.) and inorganic materials (e.g. silicon monoxide (SiO), etc.).

Figure 2B:
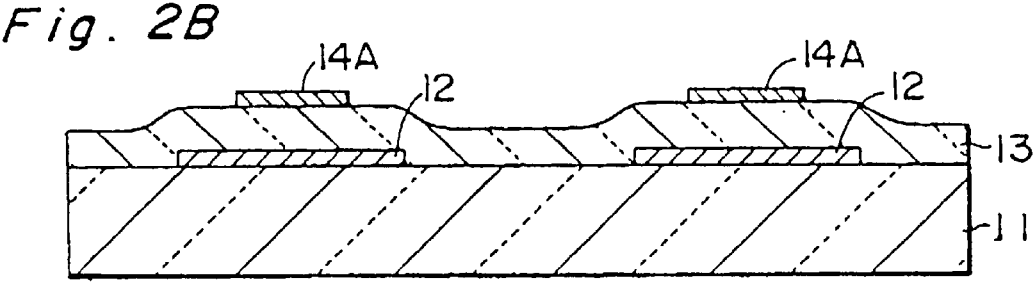

Then, as shown in FIG. 2B, on the whole surface of the glass substrate 11, a first interlayer insulating film 13 of silicon oxide ($SiO_2$) is deposited in a thickness of 100 nm to 1 m as an insulating film of the metal thin film 12. As a material of the interlayer insulating film, for example, tantalum oxide ($Ta_2O_5$), silicon nitride (SiN) or a composite material thereof may be used. Then, on the first interlayer insulating film 13, a semiconductor layer 14A of amorphous silicon (a-Si) as a seed crystal is deposited by the plasma CVD process. The amorphous silicon (a-Si) as the seed crystal may also be deposited by the low-pressure CVD process and the sputtering process. Thereafter, the seed crystal is welded and crystallized on the semiconductor layer 14A by using an excimer laser to form a polycrystal silicon (p-Si) film 14B. An argon laser can also be used in place of the excimer laser. A solid phase growth of the polycrystal silicon may be used to form the polycrystal silicon.

Figure 2C:
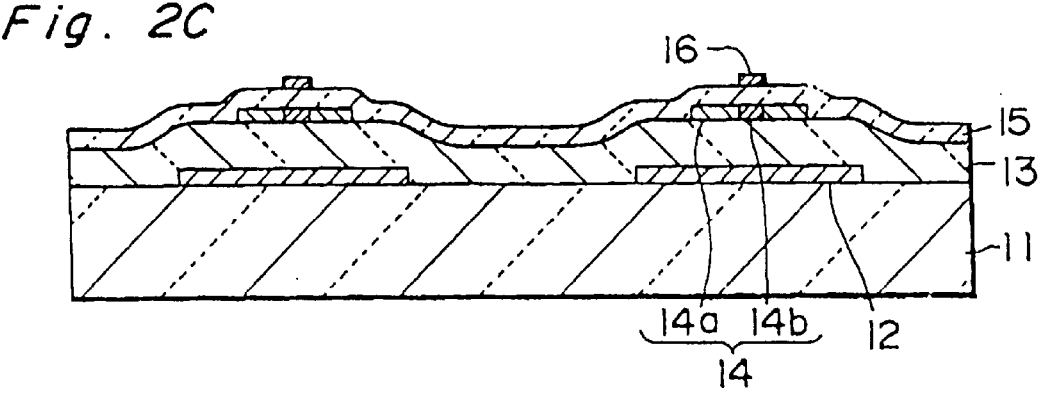

Then, as shown in FIG. 2C, a gate insulating film 15 of silicon oxide ($SiO_2$) is deposited on the whole surface of the glass substrate 11 in a thickness of 100 nm, and then a gate electrode formation film is deposited on the gate insulating film 15 to form a gate electrode 16 in a predetermined pattern. Using the gate electrode 16 as a mask, phosphorus (P) or boron (B) is allowed to pass through the gate insulating film 15 to perform ion implantation to the polycrystal silicon film 14B to form an ohmic region 14a. The region where impurities are not implanted becomes a channel region 14b of the thin film transistor.

Figure 3A:
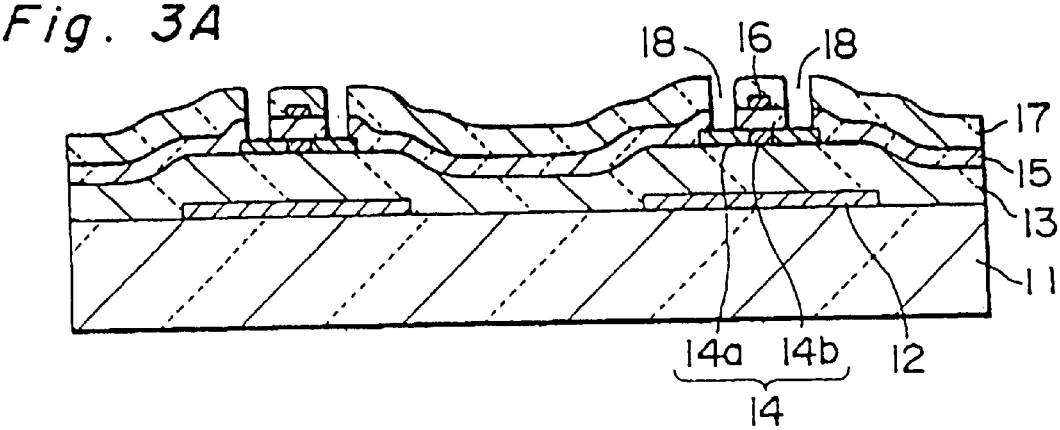
FIGS. 3A to 3C are sectional views each showing a step in the method for producing the active matrix liquid crystal panel for a projection system according to the first embodiment of the present invention.

Then, as shown in FIG. 3A, a second interlayer insulating film 17 of silicon oxide ($SiO_2$) for insulating a gate electrode 16, a source electrode and a drain electrode is deposited on the whole surface of the glass substrate 11 in a thickness of 400 nm, and then the second interlayer insulating film 17 and the gate insulating film 15 are etched in the same pattern to form each contact hole 18 of the source electrode and the drain electrode, respectively.

Figure 3B:
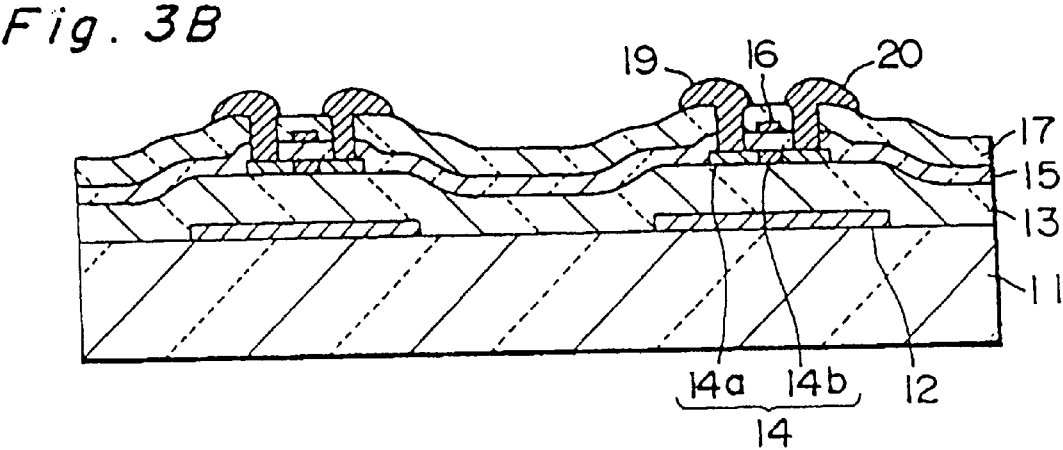

Then, as shown in FIG. 3B, a source electrode 19 and a drain electrode 20 are respectively formed by using a metal such as aluminum (Al), etc.

Figure 3C:
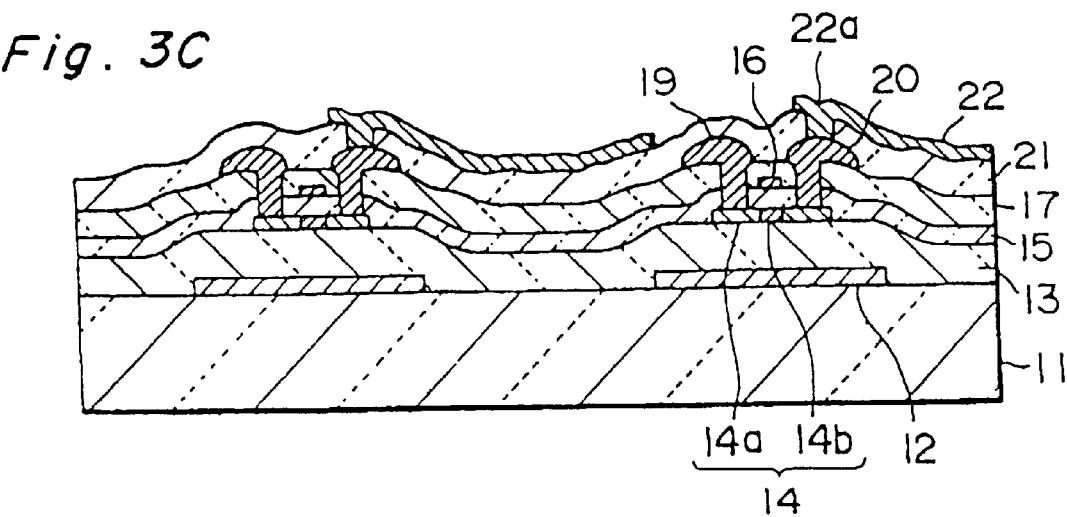
Figure 4:
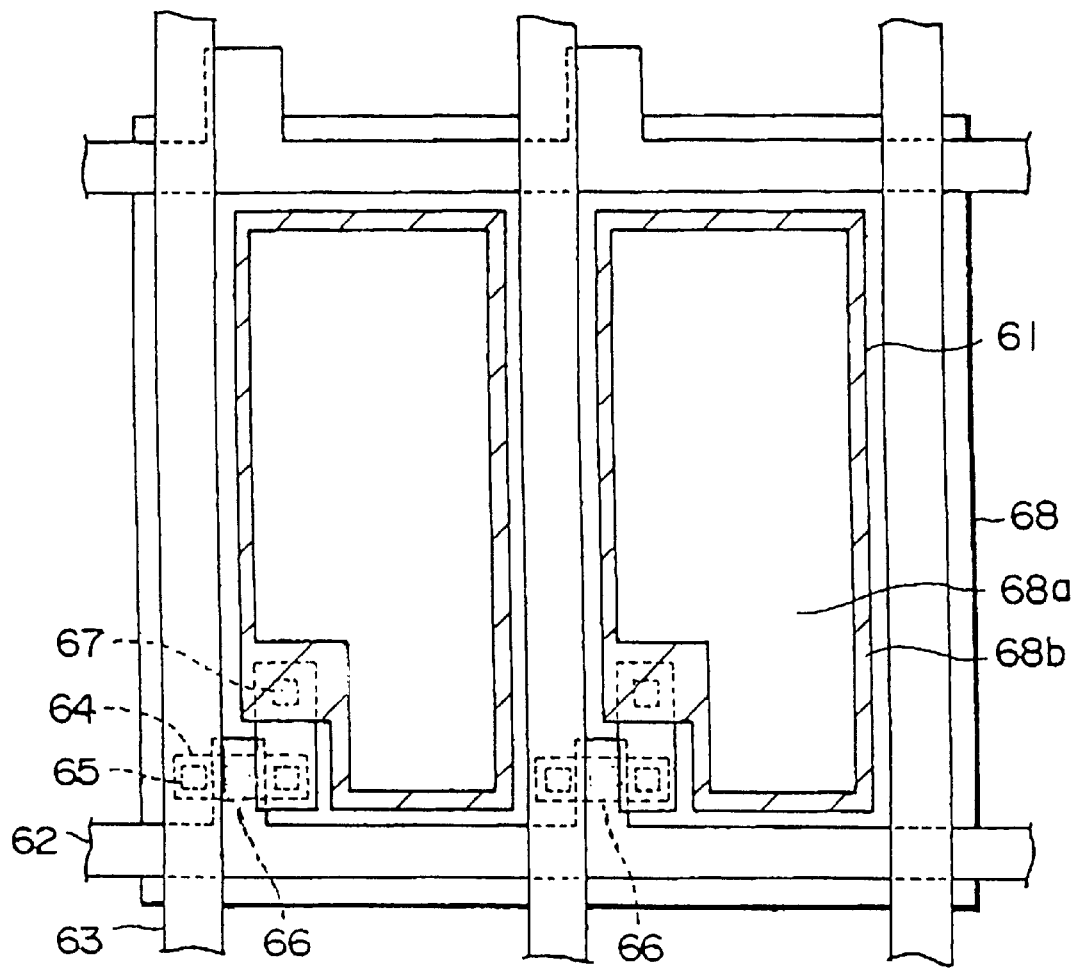
FIG. 4 is a plan view showing a construction of an array substrate of the active matrix liquid crystal panel for a projection system according to the first embodiment of the present invention.

Then, as shown in FIG. 3C, a third interlayer insulating film 21 of silicon oxide ($SiO_2$) for insulating the source electrode 19 and the drain electrode 20 is deposited on the whole surface of the glass substrate 11 in a thickness of 100 nm, and a contact part 22a of the drain electrode 20 and the pixel electrode 22 is selectively formed on the third interlayer insulating film 21. Thereafter, the pixel electrode 22 of ITO is formed so as to extends to the side end part of the source electrode 19 of the adjacent thin film transistor. Thus, an array substrate 31 having the active matrix array is completed. A plan view after the completion of the array is substantially the same as shown in FIG. 4.

As described above, according to the present embodiment, since the metal thin film 12 as a light shielding film completely shields direct light 33 incident on the surface of the array substrate at a right angle from the side of the array substrate 31, light does not enter into the semiconductor region of the thin film transistor part. Therefore, leakage current of the transistor by means of light does not increase, thereby obtaining good display characteristic.

The aforementioned effect is obtained irrespective of the material of the light shielding film. In the present embodiment, since the light shielding film is made of a metal, the thermal conductivity is larger than that of the black resin, an increase in temperature of the light valve can be inhibited. Also, since the film thickness can be made thinner than the black resin, it becomes hard to form the non-oriented region of the liquid crystal by means of the step part formed on the peripheral part of the light shielding film. As a result, a liquid crystal light valve having higher display characteristic can be provided.

(Second embodiment)

The second embodiment of the present invention will be explained with reference to the accompanying drawings, hereinafter.

The second embodiment is different from the first embodiment in that the aperture rate is further improved by using a peripheral cover 68b for covering the pixel electrode 61 and the light shielding film 68 shown in FIG. 4 as an storage conductance of a pixel.

With respect to a specific construction, said light shielding film 68 of the array substrate is formed of metal such as chromium (Cr), etc., comprising an opening part 68a which exposes a pixel electrode 61, and a peripheral cover part 68b formed by covering the peripheral part of a scanning line 62, a data line 63, a polycrystal silicon film 64, a drain electrode 67 and a pixel electrode 61, the metal part being electrically connected to the drain electrode 67. Furthermore, a fetching part of the light shielding film 68 is formed outside of the display region, and the fetching part is allowed to serve as the storage capacitance by controlling a potential of the light shielding film 68.

The operation of each electrode of the liquid crystal panel constituted in the aforementioned manner will be explained on the basis of a timing chart shown in FIG. 5.

Figure 5:
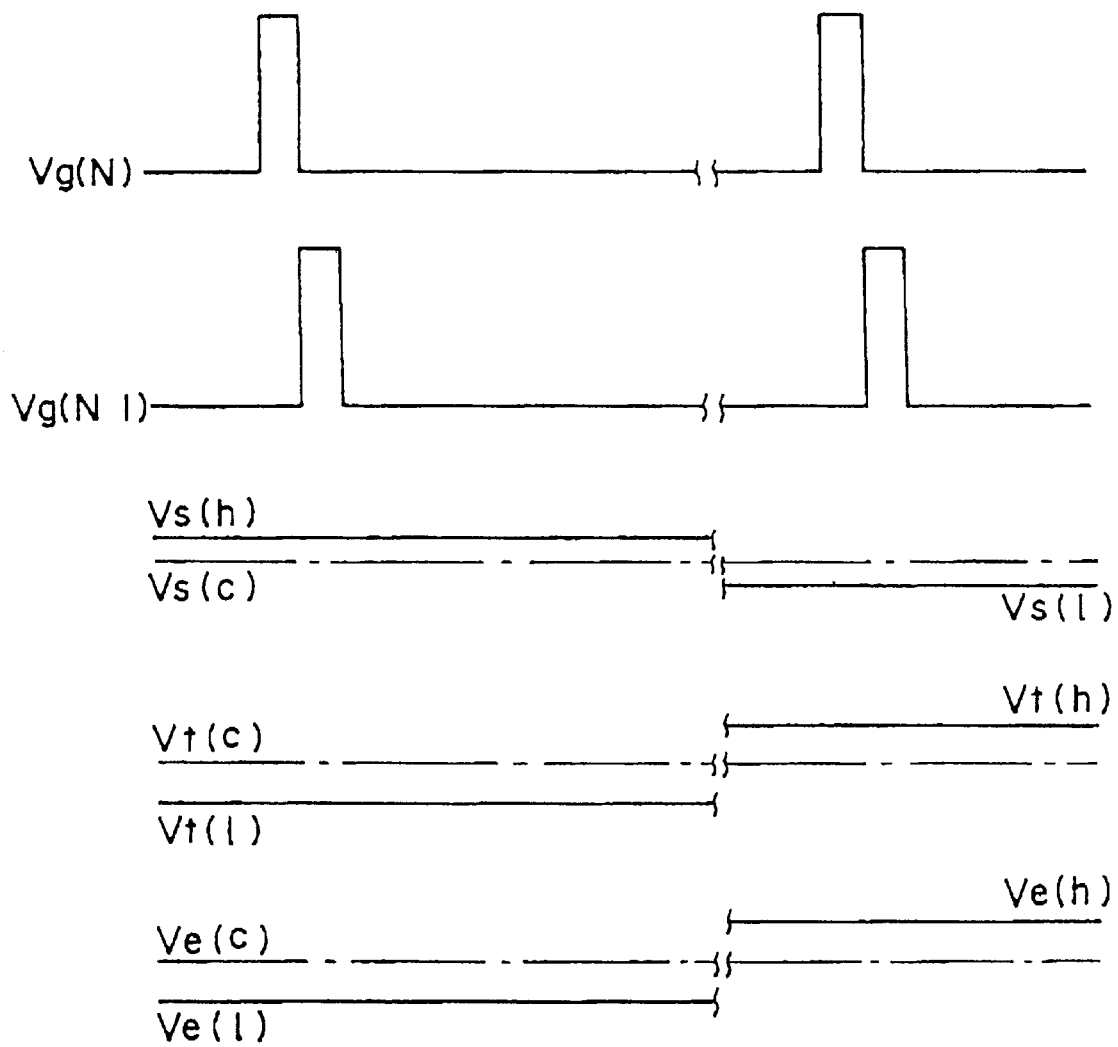
FIG. 5 is a view showing a timing chart of a voltage applied to each electrode of the liquid crystal panel according to the second embodiment of the present invention.

FIG. 5 is a timing chart of a voltage applied to each electrode of the liquid crystal panel according to the second embodiment of the present invention. In FIG. 5, Vg (n) and Vg (n+1) indicate a n-th driving voltage and a (n+1)-th driving voltage of the scanning line, respectively. Vs indicates a waveform of a data line to which a pixel signal is applied. Vs (c) indicates a central value of an image signal. Vs (h) and Vs (l) indicate a high level and a low level of the image signal, respectively.

Vt (c), Vt (b), Vt (I) indicate a central level signal, a high level signal and a low level signal of a voltage applied to the opposite electrode side, respectively. In the present embodiment, polarities of the high level signal and the low level signal are reverted. As a consequence, an amplitude of the image signal voltage can be lowered.

Ve (c), Ve (h) and Ve (l) indicate a central level signal, a high level signal and a low level signal of a voltage applied to a common electrode, respectively. It is assumed that the light shielding film 68 having the aforementioned conductivity is connected. In this case, it is possible to decrease the signal level by setting the equation of Ve=Vc. It is also possible to control Vt and Ve, independently. Furthermore, polarities of the voltage of the opposite electrode and that of the common electrode may be changed for each one horizontal scanning period. Accordingly, it is possible to reduce the amplitude of the signal to be added to the data line to half or less compared with the case where no polarity is reversed.

As described above, according to the present embodiment, since the light shielding film serves as a light shielding film and, at the same time, the peripheral covering part of the pixel electrode and the light shielding film shown in FIG. 4 is formed so as to serve as an electrode of a supplementary capacitance of the liquid crystal cell. Therefore, the storage capacitance line for producing the storage capacitance becomes unnecessary and the aperture rate of the region occupied by the storage capacitance line can be further enlarged.

(Third embodiment)

The third embodiment of the present invention will be explained with reference to the accompanying drawings, hereinafter.

An AM-LCD for a projection system of the present embodiment is constituted by the same array substrate as that of aforementioned first embodiment and second embodiment as explained in FIGS. 1, 2A to 2C, 3A to 3B and 4. That is, this AM-LCD was prepared according to steps as shown in FIGS. 6A to 6F. FIGS. 6A to 6F are corresponding to the steps as shown in FIGS. 2A to 2C and 3A to 3C, where the same parts are denoted by the same numbers in both steps.

Figure 7:
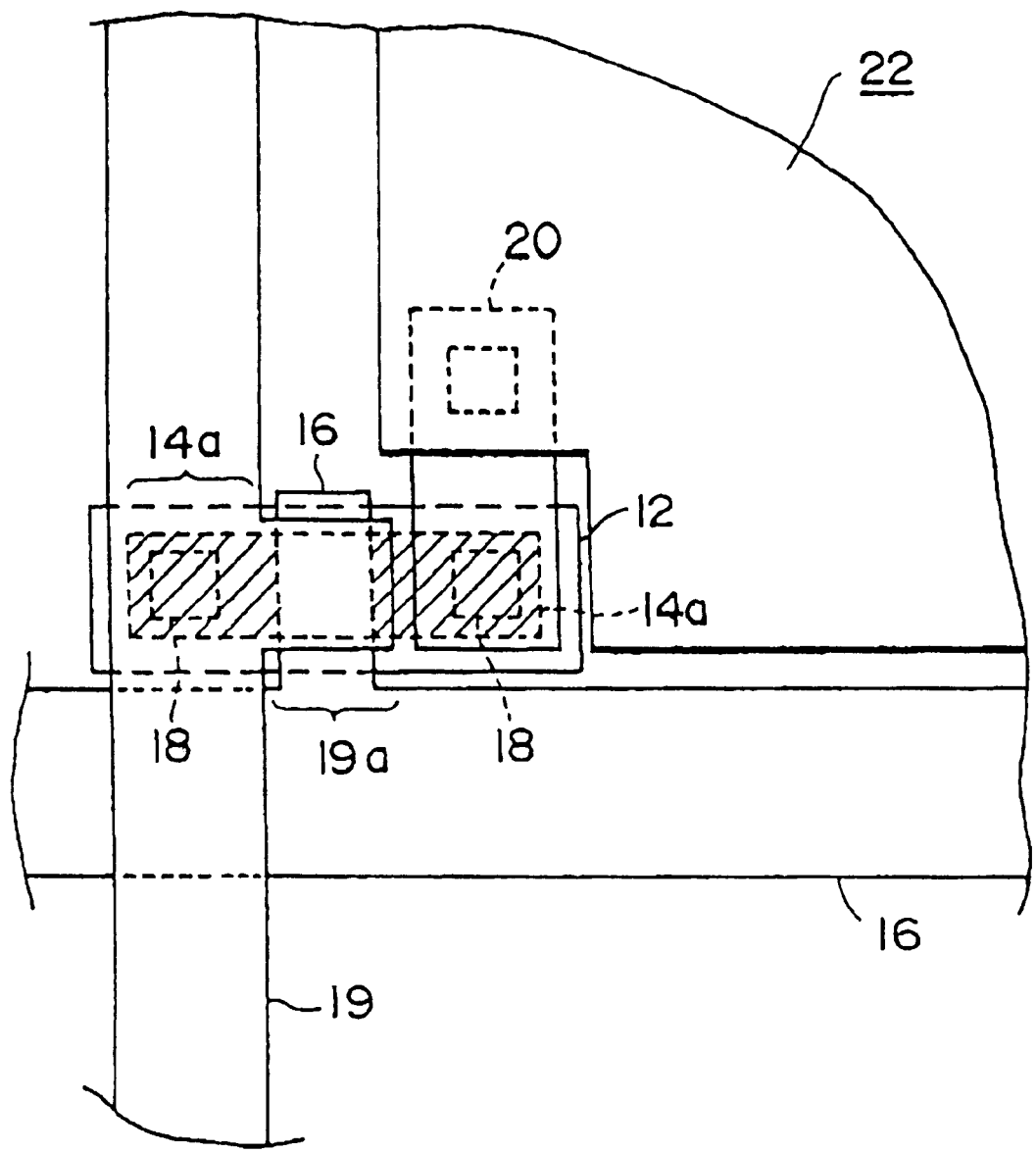
FIG. 7 is a partial plan view showing a construction of an array substrate of the active matrix liquid crystal panel for a projection system according to the third embodiment of the present invention.

As a feature of the present embodiment, as shown in FIG. 7, when the source electrode 19 and the drain electrode 20 are formed in a predetermined pattern after forming the contact hole 18, the pattern of the source electrode 19 for transmitting an image signal is formed into a structure wherein a channel part of the TFT is covered by a part 19a to prevent light incident from above. By adopting this structure, it becomes possible to shield a light incident from above into the liquid crystal panel. Accordingly, an increase in leakage current of the transistor by means of light does not arise and it becomes possible to obtain good display characteristics.

(Fourth embodiment)

The fourth embodiment of the present invention will be explained hereinafter. As a feature of the fourth embodiment, a polymer dispersion type liquid crystal wherein a liquid crystal is dispersed in a polymer is used as a liquid crystal material to be sealed in the light valve, in place of TN liquid crystal. This polymer dispersion type liquid crystal performs a light switching operation in the dispersion state shown in FIG. 8A and the transmission state shown in FIG. 8B.

Figure 8A:
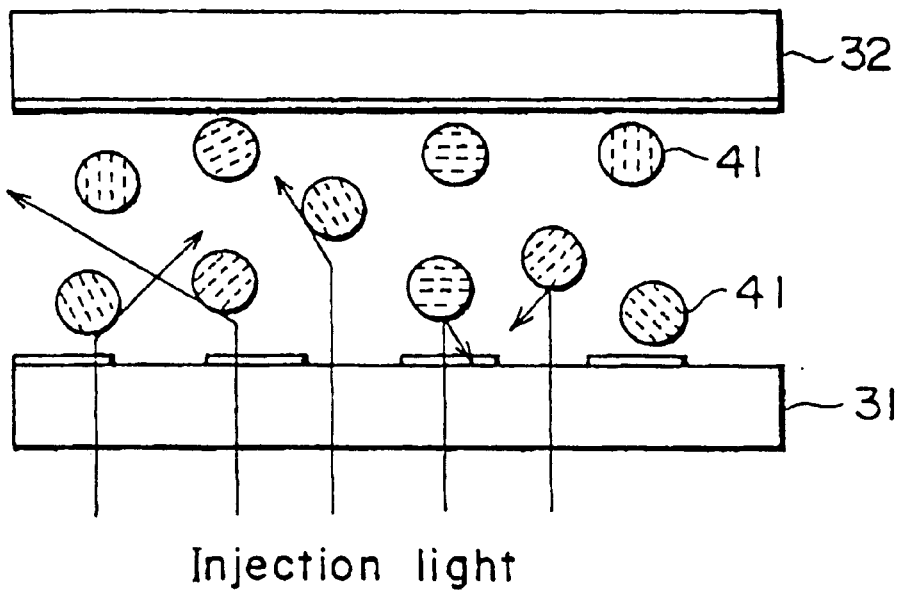
FIGS. 8A and 8B are schematic views showing an optical switching operation due to a light transmission and light scattering of a polymer dispersion type liquid crystal in the active matrix liquid crystal panel for a projection system according to the fourth embodiment of the present invention.
Figure 8B:
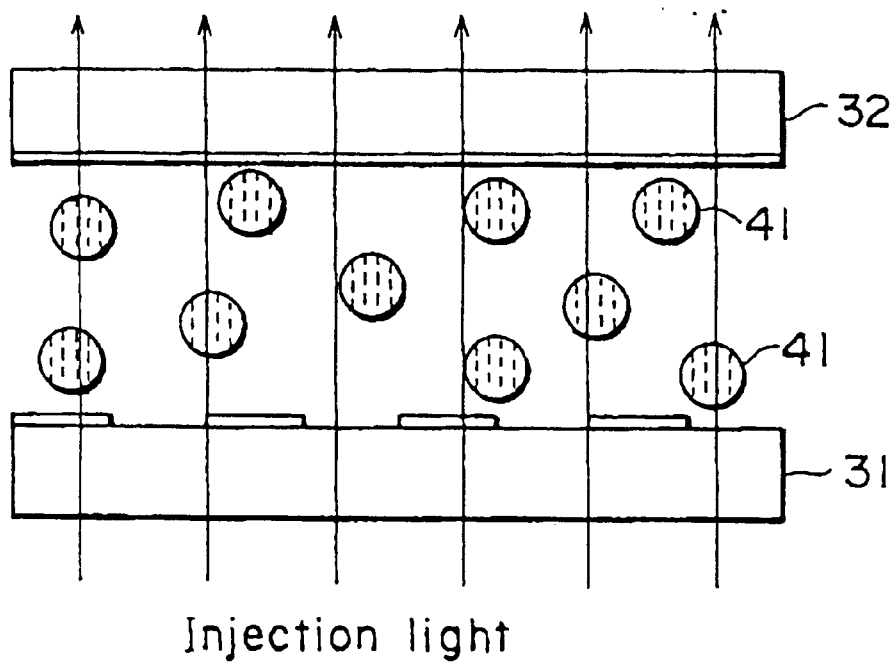

In the dispersion state shown in FIG. 8A, since a voltage applied to the array substrate 31 and the opposite substrate 32 are set to the state where no voltage is applied, the orientation of the liquid crystal in a liquid drop 41 which is present in the polymer becomes voluntary. Therefore, light is reflected in a voluntary direction at the interface between the liquid crystal in this liquid drop 41 and the polymer.

An injection light having an incident angle in the liquid crystal cell shown in FIG. 1 according to the first embodiment, which is smaller than the right angle with respect to the substrate surface, is not easily generated in case of a general TN liquid except for the reflection at the edge part of the pattern such as light shielding film, wiring, etc.

However, in case of the polymer dispersion type liquid crystal, since the amount of the scattered light having such a small incident angle increases, the proportion of the scattered light which goes to the TFT side from the upper surface of the array substrate 31 becomes extremely large.

Accordingly, as shown in FIG. 9, when a comparison between the case of using a polymer dispersion type liquid crystal 51 and the case of using a TN liquid crystal 52 is made by means of a voltage-transmittance characteristic curve, a variation in voltage between the case of irradiating light shown by a solid line from the back side of TFT and the case of irradiating no light shown by a broken line, the variation in voltage in case of using the polymer dispersion liquid crystal 51 is larger than that in the case of using the TN liquid crystal 52.

Accordingly, in the TFT structure according to the third embodiment, the effect becomes more remarkable when using the polymer dispersion type liquid crystal as the liquid crystal material of the light valve.

Figure 10:
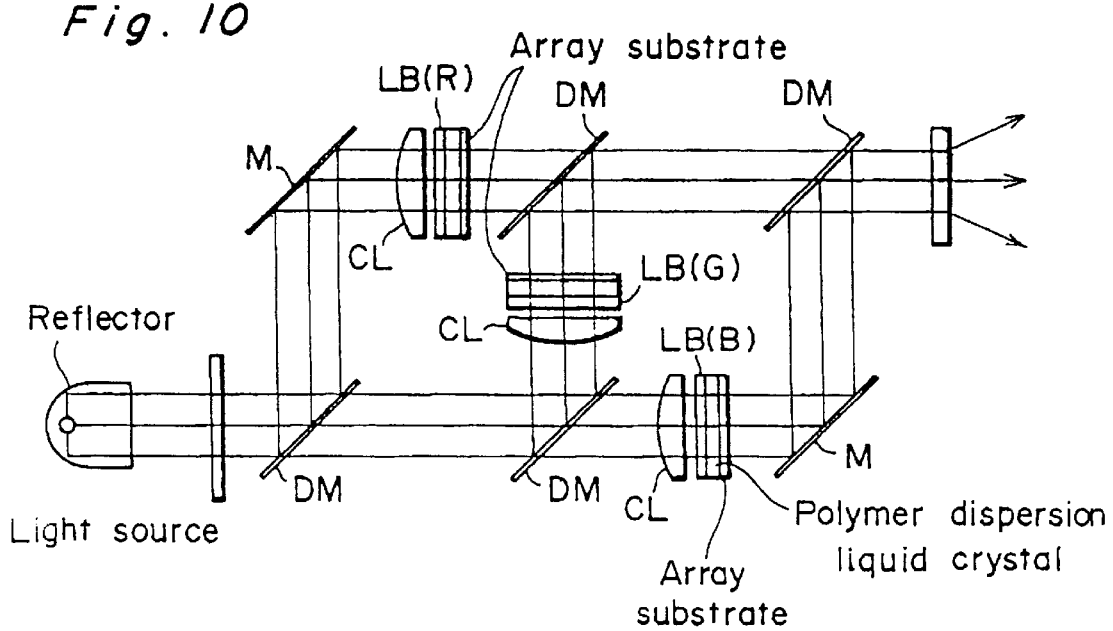
FIG. 10 is a view showing a construction of a liquid crystal projector using the active matrix liquid crystal panel according to the fifth embodiment of the present invention.
Figure 12:
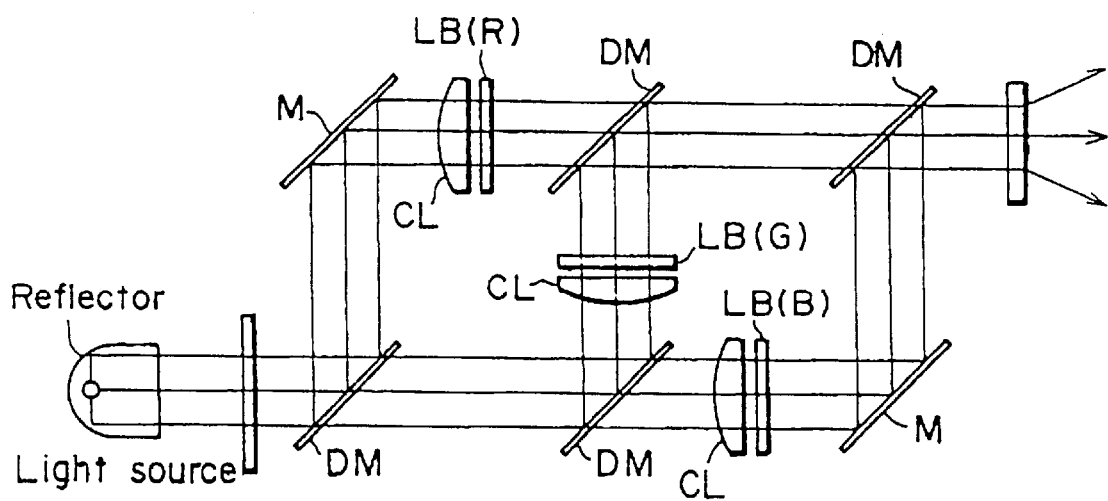
FIG. 12 is a view showing a construction of a typical three-plate type projection system (liquid crystal projector) using a conventional liquid crystal display panel as a light valve for optical switching.
Figure 13:
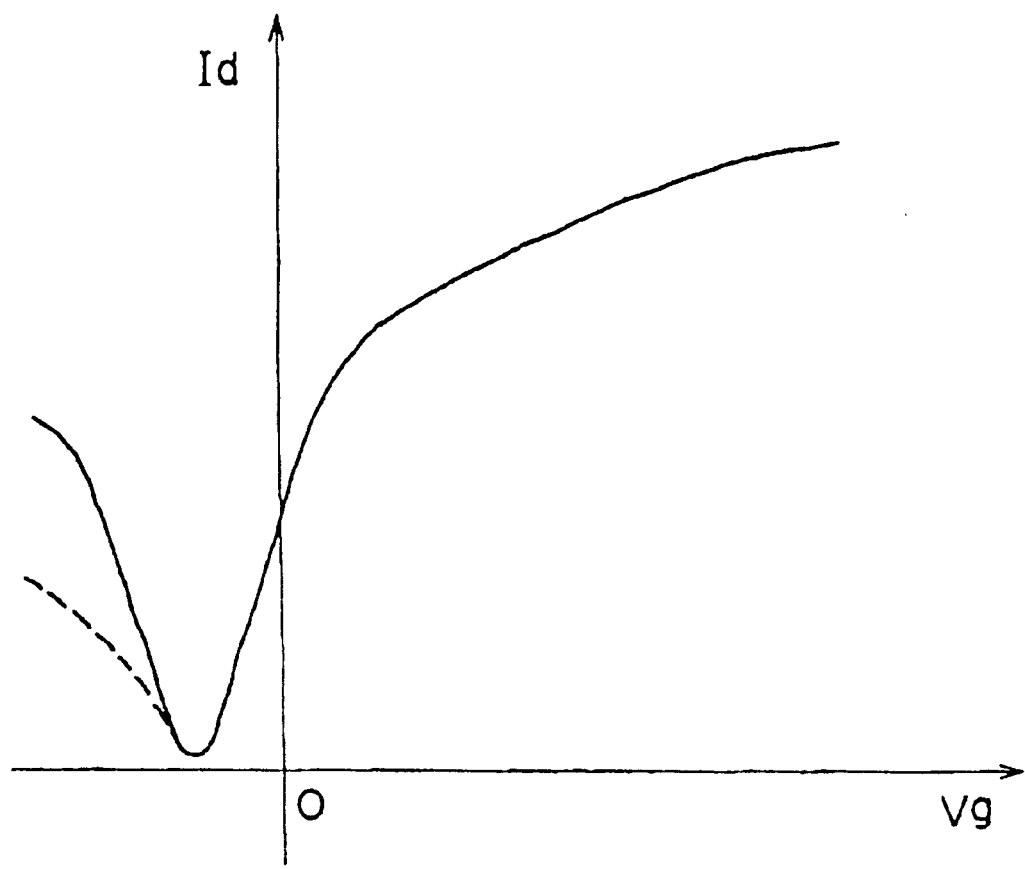
FIG. 13 is a graph showing a characteristic curve of a drain current (Id)—gate voltage (Vg) of a transistor.

FIG. 10 is a view showing a construction of a projection system using the liquid light valve according to the fourth embodiment of the present invention. In this case, the incident direction of light from the lamp is set to the side of the TFT substrate. The reason is that, in the construction of the fourth embodiment, the incidence of light with respect to the channel part is basically prevented irrespective of the incident direction of light. However, in the source electrode covering the light shielding film at the lower part of TFT and the upper part of the channel the lower part light shielding film has a larger effect in terms of the area. Furthermore, when the dispersed light and the reflection light within the liquid crystal light valve are compared with each other, the strength of the incident light from the lamp is larger.

What is claimed is:

1. A projection system comprising:

a light source;

at least one liquid crystal panel operable as light valves for optical switching; and a projection lens operable to project light on a screen as an image;

wherein said liquid crystal panel is an active matrix liquid crystal display panel comprising:

first and second transparent substrates located opposite to each other and defining the outer sides of said active matrix liquid crystal display panel, wherein light emitted from said light source enters said active matrix liquid crystal display panel through said first transparent substrate;

a liquid crystal layer interposed between said first and second transparent substrates, said liquid crystal layer being a complex of a liquid crystal material dispersed in a polymer matrix;

a layer comprising thin film transistors interposed between said first transparent substrate and said liquid crystal layer; and a light shielding layer interposed between said first substrate and said layer comprising said thin film transistors for shielding said thin film transistors from an injection of light.

2. A projection system as claimed in claim 1, wherein:

said first transparent substrate is provided with scanning lines extending laterally in a parallel manner, data lines extending vertically in a parallel manner to cross said scanning lines, and a plurality of pixel electrodes each positioned in each one of areas enclosed by said scanning lines and said data lines, and said second transparent substrate is provided with a transparent electrode opposed to said pixel electrodes;

said thin film transistors are each positioned in one of said areas enclosed by said scanning lines and said data lines and each comprise a gate electrode connected to one of said scanning lines, a source electrode connected to one of said data lines, and a drain electrode connected to one of said pixel electrodes; and said light shielding layer has a plurality of openings through which each of said pixel electrodes is exposed against the injection of light.

3. A projection system as claimed in claim 2, wherein said light shielding layer is made of an electrically conductive material.

4. A projection system as claimed in claim 3, wherein said light shielding layer is connected to an electric source to make a storage capacitance between overlapping areas of said pixel electrodes and said light shielding layer.

5. A projection system as claimed in claim 4, wherein a level of voltage applied on said data lines and a level of voltage applied on said light shielding layer are adverse to each other with respect to polarities of the applied voltage so as to depress an amplitude of an image signal voltage.

6. A projection system as claimed in claim 1, wherein:

said first transparent substrate is provided with scanning lines extending laterally in a parallel manner, data lines extending vertically in a parallel manner to cross said scanning lines, and a plurality of pixel electrodes each positioned in each one of areas enclosed by said scanning lines and said data lines, and said second transparent substrate is provided with a transparent electrode opposed to said pixel electrodes;

said thin film transistors are each positioned in one of said areas enclosed by said scanning lines and said data lines and each comprise a gate electrode connected to one of said scanning lines, a source electrode connected to one of said data lines, and a drain electrode connected to one of said pixel electrodes; and wherein said source electrode is formed to shield a channel zone of said thin film transistors from light scattering back from said crystal liquid layer.

7. A projections system as claimed in claim 6, wherein said light shielding layer has a plurality of openings through which each of said pixel electrodes is exposed against light entering into said liquid crystal layer from said first substrate side.

* * * * *